United States Patent

Shiragaki et al.

[11] Patent Number: 6,125,104
[45] Date of Patent: Sep. 26, 2000

[54] NETWORK NODE FOR SWITCHING QUALITY DETECTOR TO INCOMING SIGNAL SPECIFIED BY REQUEST MESSAGE FROM ADJACENT NODE

[75] Inventors: Tatsuya Shiragaki; Naoya Henmi, both of Tokyo, Japan

[73] Assignee: NEC Corporation, Tokyo, Japan

[21] Appl. No.: 08/918,352

[22] Filed: Aug. 26, 1997

[30] Foreign Application Priority Data

Aug. 26, 1996 [JP] Japan .................................. 8-223331

[51] Int. Cl.[7] ........................................................ H04J 1/16
[52] U.S. Cl. .......................... 370/216; 370/244; 370/250
[58] Field of Search .................................. 359/110, 123, 359/135, 179; 370/216, 217, 222, 224, 264, 333, 248, 242, 249–251, 535, 254, 257, 258; 371/5.1; 395/181, 182.07, 182.02

[56] References Cited

U.S. PATENT DOCUMENTS

| | | | |
|---|---|---|---|
| 4,393,493 | 7/1983 | Edwards | 370/228 |
| 5,444,563 | 8/1995 | Forsberg | 359/179 |
| 5,638,514 | 6/1997 | Yoshida et al. | |
| 5,663,820 | 9/1997 | Shiragaki | 370/360 |
| 5,805,593 | 9/1998 | Busche | 370/396 |

FOREIGN PATENT DOCUMENTS 3-232352 10/1991 Japan .
6-164523 6/1994 Japan .

OTHER PUBLICATIONS

Japanese Office Action issued Nov. 9, 1999 in a related application.
English translation of relevant portions of Japanese Office Action.

*Primary Examiner*—Chau Nguyen
*Assistant Examiner*—Chiho Andrew Lee
*Attorney, Agent, or Firm*—Ostrolenk, Faber, Gerb & Soffen, LLP

[57] ABSTRACT

A network node comprises a cross-connect switch and a single signal quality monitor connected to one of the output ports of the cross-connect switch. The switch is controlled by a processor to establish connections. The processor is responsive to a request message from another network node for causing the switch to establish a connection between one of the input ports of the switch specified by the request message and the signal quality monitor and returns a reply message indicating a quality level of a signal appearing at the input port. A switched telecommunications network, such as Internet, may be used for transmission of the request and reply messages. Alternatively, the request and reply messages may be multiplexed with traffic signals.

13 Claims, 4 Drawing Sheets

NETWORK NODE FOR SWITCHING QUALITY DETECTOR TO INCOMING SIGNAL SPECIFIED BY REQUEST MESSAGE FROM ADJACENT NODE

BACKGROUND OF THE INVENTION

1. Field of the Invention

The present invention relates generally to cross-connect systems, and more specifically to a cross-connect network node for monitoring signal quality for detection and restoration of link failure.

2. Description of the Related Art

In high-speed communication networks, it is the usual practice to provide a signal quality monitor circuit on a per-link basis. In the SONET (synchronous optical network) system, monitoring is performed on supervisory signals embedded in a time-division multiplexed signal, using the byte-interleaved parity contained in section, line and path overheads. However, the provision of monitor circuits on a per-link basis would result in an increase in the amount of OAM (operations, administration and maintenance) information which must be contained in the transport overhead of a frame. Additionally, if optical communication links are used for interconnecting nodes, routing of optical signals is implemented by an optical cross-connect switch without conversion to electrical signals. However, if monitor circuits are provided on a per-link basis, it is obviously disadvantageous that optoelectrical converters must be provided on a per-link basis.

SUMMARY OF THE INVENTION

It is therefore an object of the present invention to provide a network node which eliminates the need for monitoring signals on a per-link basis.

According to the present invention, there is provided a cross-connect network node comprising a cross-connect switch having a plurality of input ports and a plurality of output ports. A single signal quality monitor is connected to one of the output ports of the cross-connect switch. The switch is controlled by a processor, or control means, which causes the switch to establish connections between the input ports and the output ports. The processor is responsive to a request message from another network node for causing the switch to establish a connection between one of the input ports which is specified by the request message and the signal quality monitor and transmitting a reply message to the another network node, indicating a quality level of a signal appearing at the input port.

A switched telecommunications network, such as Internet, may be used for receiving the request message and transmitting the reply message. Alternatively, multiplexed channels may be used for receiving the request message and transmitting the reply message.

In one embodiment, a plurality of dc-level detectors are additionally provided for receiving replicas of signals applied respectively to the input ports of the cross-connect switch and detecting a dc-level of each of the replica. The processor is responsive to one of the detected dc-levels having a predetermined value for transmitting an alarm message to another node and responsive to a request message therefrom for controlling the cross-connect switch to establish a connection between one of the input ports specified by the request message and the signal quality monitor to allow it to determine a quality level of an idle signal which appears at the input port.

In a modified embodiment, a plurality of section/line overhead extraction circuits are provided for receiving replicas of signals applied respectively to the input ports of the cross-connect switch and extracting section/line overheads from the replicas, respectively. A bit error rate monitor determines the bit error rate of a signal identified by a section/line identifier contained in each one of the extracted overheads. The processor is responsive to the bit error rate of a predetermined value for transmitting an alarm message to another node and responsive to a request message therefrom for controlling the cross-connect switch to establish a connection between one of the input ports specified by the request message and the path overhead extraction circuit to allow the bit error rate monitor to determine a bit error rate of an idle signal which appears at the input port.

BRIEF DESCRIPTION OF THE DRAWINGS

The present invention will be described in further detail with reference to the accompanying drawings, in which.

DETAILED DESCRIPTION

Figure 1:
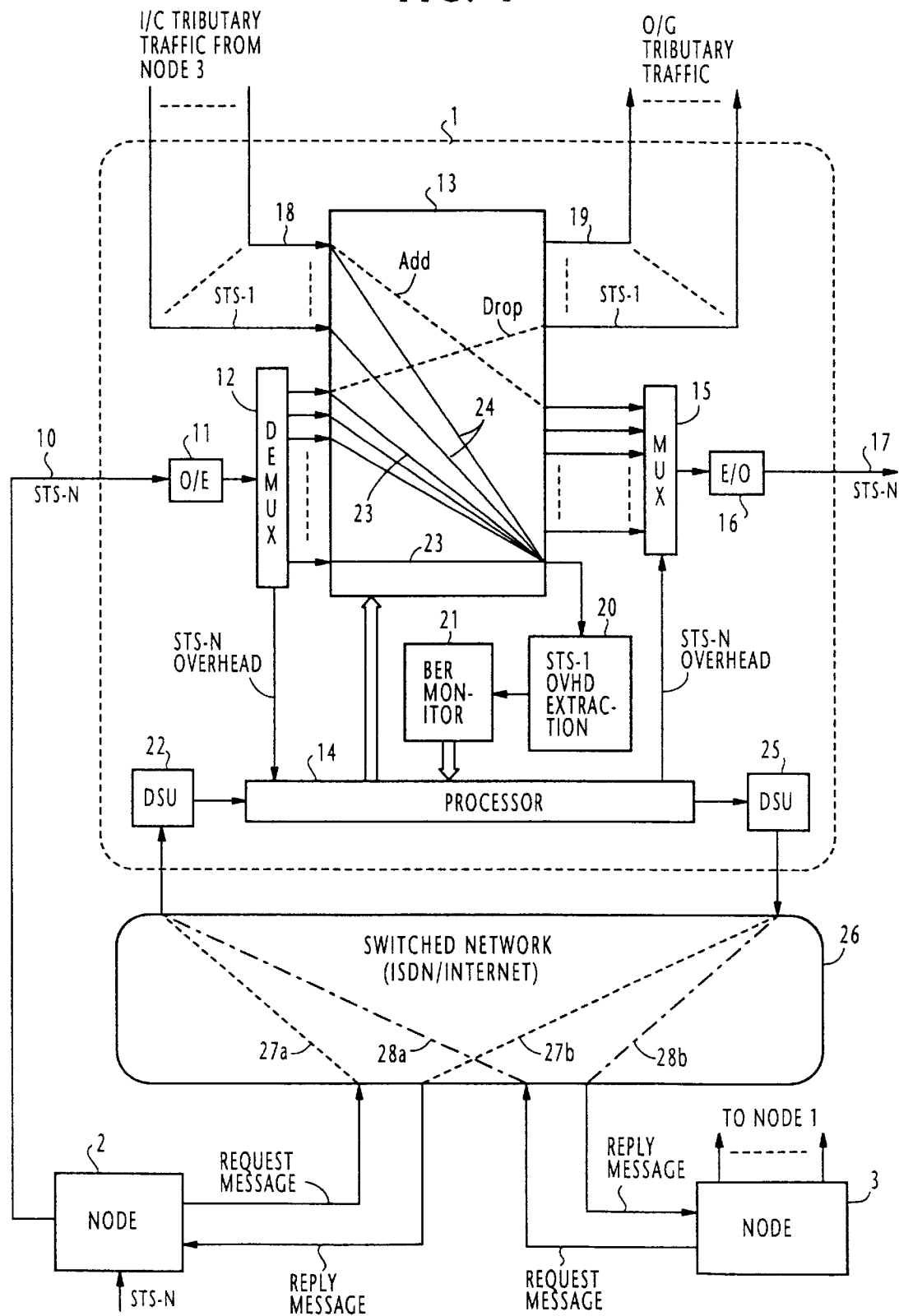
FIG. 1 is a block diagram of a cross-connect network according to a one embodiment of the present invention.

Referring now to FIG. 1, there is shown a SONET-based communication network according to one embodiment of the present invention. At a typical example, the network includes a node 1 that receives an STS-N (synchronous transport signal level-N) frame from an adjacent upstream node 2 via an incoming optical transmission link 10. The received optical signal is converted to an electrical signal by an optical receiver (optoelectrical converter) 11. The electrical STS-N frame is coupled to a demultiplexer 12 where the frame is unpacked into a plurality of STS-1 frames and the STS-N transport overhead is extracted. The unpacked STS-1 frames are fed to respective input ports of a cross-connect switch 13 and the extracted overhead is supplied to a processor, or workstation 14. The STS-1 frames supplied to the switch 13 are routed to output ports of the switch via "transit" connections established in accordance with a control signal from the processor 14. The extracted overhead contains OAM information which is analyzed by processor 14 to determine whether it is necessary to reconfigure connections already established in the cross-connect switch 13 or relay the received OAM (operations, administration and maintenance) information to downstream nodes. If the latter is the case, an OAM signal is produced by the processor 14 and contained in an STS-N transport overhead for transmission to downstream nodes.

The routed STS-1 frames are supplied to a multiplexer 15 where they are packed into the synchronous payload envelope (SPE) of an outgoing STS-N frame and multiplexed with the STS-N transport overhead in which the downstream OAM information is contained. After conversion to an optical signal by an optical transmitter 16 (electrooptical converter), the STS-1 frame is forwarded to a downstream node, not shown, via an outgoing optical link 17.

The node 1 may also provide an add/drop multiplexing function by inserting incoming STS-1 tributary traffic via incoming lines 18 from an adjacent node 3 into the SPE of the outgoing STS-N frame and dropping unpacked STS-1 frames from the node 2 to outgoing lines 19 by establishing "add/drop" connections in the cross-connect switch 13.

According to the present invention, an STS-1 path overhead extraction circuit 20 is connected to one of the output ports of the cross-connect switch 13 for extracting a path overhead from a STS-1 frame. The extracted overhead is supplied to a bit-error-rate monitor circuit 21. BER monitor circuit 21 uses parity in B3-byte field of the extracted overhead to determine the bit error rate of overhead bytes of a predetermined bit pattern located in a field specified by a path identifier. The output of the BER monitor circuit 21 is representative of a quality level of any STS-1 frame which can be specified by a request message.

If node 2 desires to know the signal quality of a plurality of STS-1 frames at a receive end, it sends a request message to node 1 via a switched network 26 such as Internet, using an ISDN digital subscriber line. The request message is directed through the switched network 26 to node 1 as indicated by a broken line 27a, where it is detected by a data service unit 22 and the processor 14 is informed of the identification numbers of STS-1 frames specified by node 2.

In response to the request message from node 2, the processor 14 sequentially establishes a connection 23 in the switch 13 between each of the specified frames and the STS-1 path overhead extraction circuit 20. The bit error rate performance of each of the specified STS-1 frames is determined by the BER monitor 21 and the result of the measurement 15 encapsulated in a reply message and applied to a DSU 25. The reply message is directed from DSU 25 to node 2 via the switched network 26 as indicated by a broken line 27b.

If node 3 desires to know the quality of STS-1 tributary signals sent to node 1, it likewise sends a request message specifying desired STS-1 frames to node 1 via switched network 26 as indicated by a chain-dot line 28a. The processor 14 at node 1 responds to this request message by sequentially establishing a connection 24 between each of the specified tributary frames and the overhead extraction circuit 20. The hit error rate performance of each of the specified STS-1 frames is evaluated and a reply message containing the result of the test is sent from DSU 25 and routed through switched network 26 to node 3 as indicated by a chain-dot line 28b.

It is seen therefore that, since only one set of an STS overhead extraction circuit 20 and a BER monitor circuit 21 is required for evaluating the quality of a plurality of STS-1 frames, a number of advantages are achieved in terms of cost, space and memory required for monitoring. Since request and reply messages are generated only when a need arises, Internet can be used for transmission of these messages.

Figure 2:
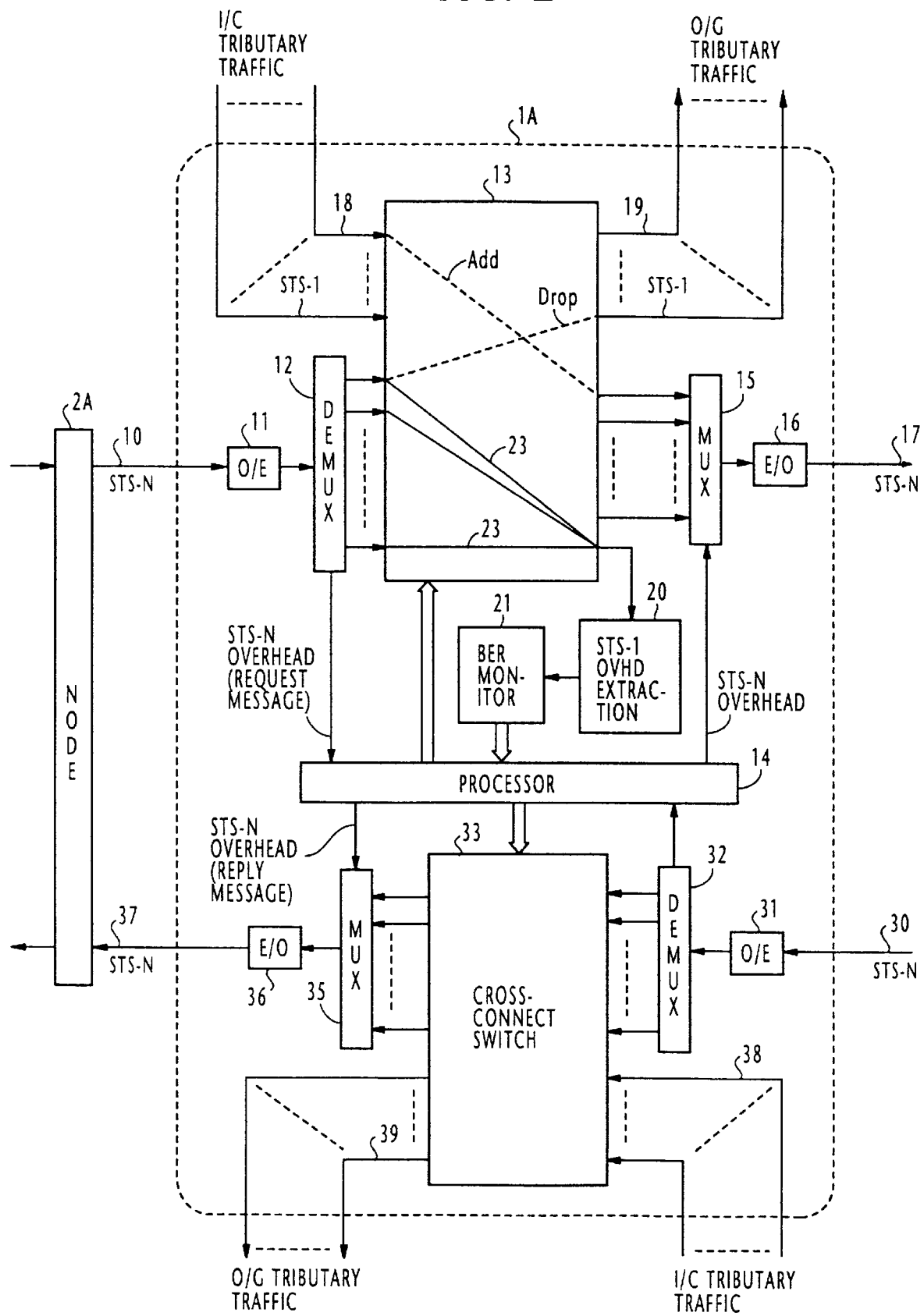
FIG. 2 is a block diagram of a modified embodiment of the present invention.

In a modified embodiment, the request and reply messages are transmitted using the transport overhead of STS-N frames. FIG. 2 illustrates a network node 1A in which cross-connect switches and their associated circuitry are provided in a symmetrical fashion for opposite directions of transmission. Node 2A is the upstream node that transmits an STS-N frame via optical link 10 to node 1A, with the frame containing a request message in its transport overhead. A path overhead is extracted by demultiplexer 12 and a request message is detected in the path overhead by the processor 14. The request message specifies one or more STS-1 frames whose quality the node 2A desires to know. If there is more than one frames to be monitored, the processor 14 sequentially establishes connections 23 in the cross-connect switch 13 between the desired STS-1 frames and the overhead extraction circuit 20 to determine their signal quality. An STS-1 path overhead extraction circuit and a BER monitor circuit may also be provided for the signals received from the link 30. However, they are omitted for simplicity.

An optical STS-N frame transmitted on optical link 30 in the direction opposite to those on link 17 is received via optical link 30, converted to an electrical signal by optical receiver 31 and unpacked into STS-1 frames by demultiplexer 32. The unpacked frames are routed through cross-connect switch 33 under control of processor 14. Some of the routed STS-1 frames are merged into an STS-N frame by multiplexer 35 and combined with an STS-N transport overhead produced by processor 14.

A reply message containing the signal quality data of the STS-1 frames specified by node 2A is inserted into an STS-N transport overhead. This transport overhead is multiplexed with the STS-N frame by multiplexer 35, converted to an optical signal by optical transmitter 36, and transmitted via an optical link 37 to node 2A.

Figure 3:
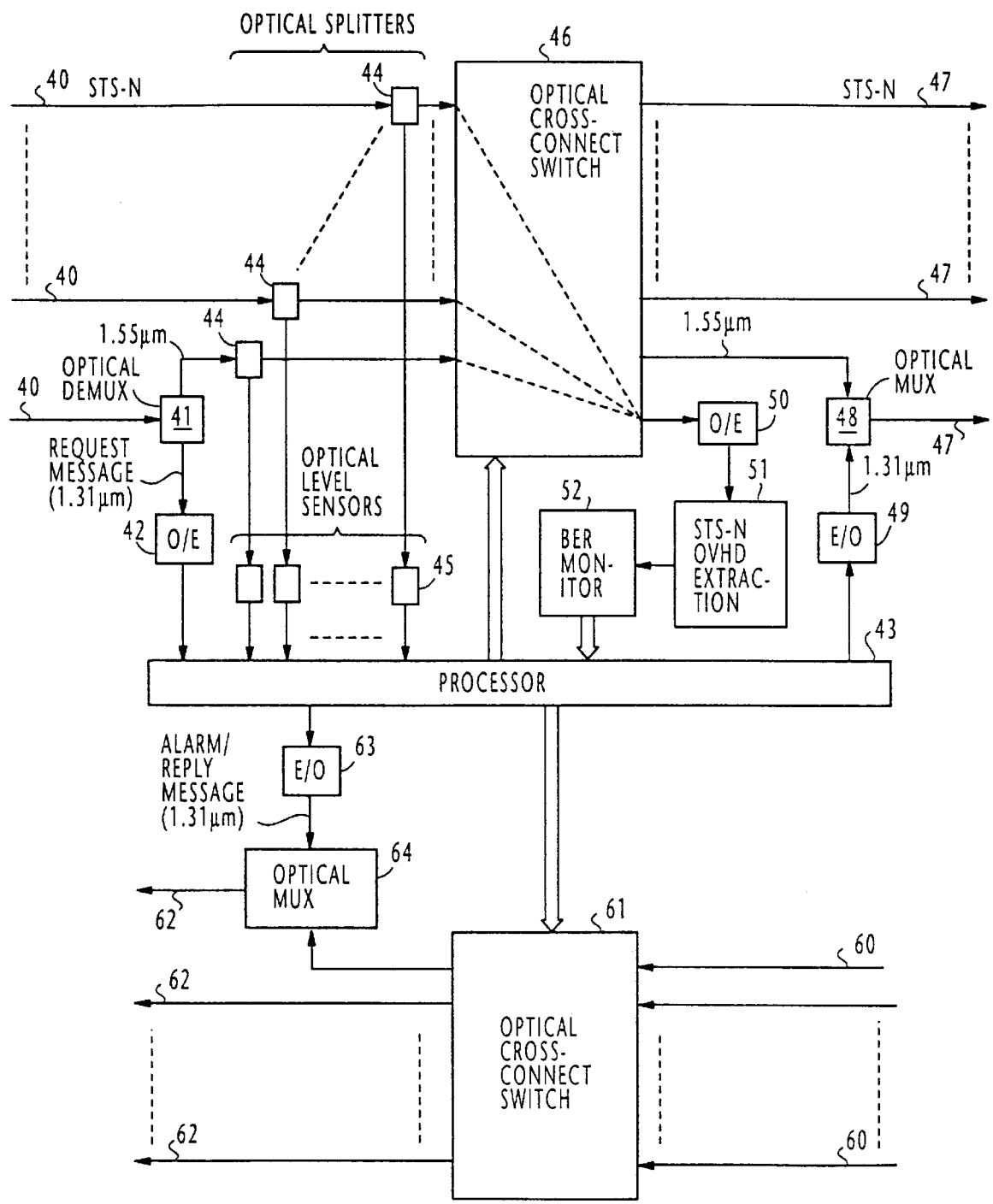
FIG. 3 is block diagram of an optical cross-connect node of the present invention.

FIG. 3 shows an optical version of the cross-connect node that incorporates the request/reply feature of the present invention. The optical node receives optical STS-N frames of wavelength 1.55 µm on a plurality of incoming optical communication links 40. On one of the incoming communication links, an STS-N frame is multiplexed with an OAM signal of wavelength 1.31 µm. The multiplexed signal is decomposed into its components by an optical demultiplexer 41. The OAM signal, converted to electrical signal by an optical receiver 42, is supplied to a processor 43, which analyze it to determine whether it is necessary to reconfigure connections already established in an optical cross-connect switch 46 or relay the received OAM information to downstream nodes. If the latter is the case, an OAM signal is produced by the processor 43 and applied to an optical transmitter 49 for conversion to a 1.31-µm optical signal.

The 1.55 µm optical STS-N frames on optical links 40 are respectively supplied to optical splitters 44 where a greater proportion of each incident light energy is supplied to a respective input port of cross-connect switch 46 and the remainder is branched to one of optical level sensors 45 connected to processor 43. The optical STS-N frames are directly routed to output ports of cross-connect switch 46 under control of processor 43 and transmitted on outgoing optical communication links 47. One of the output ports of the cross-connect switch 46 is connected to an optical multiplexer 48 where the optical OAM signal from the optical transmitter 49 is combined with an outgoing 1.55-µm STS-N frame for transmission to a downstream node.

For the opposite direction of transmission, STS-N frames of wavelength 1.55 µm from other nodes are received via optical communication links 60. They are terminated at input ports of an optical cross-connect switch 61 and routed under control of the processor 43 to output ports leading to outgoing optical communication links 62. An optical transmitter 63 is connected to the processor 43 for converting an OAM signal into a 1.31-µm optical signal and multiplexed by an optical multiplexer 64 with a 1.55-µm outgoing STS-N frame from the switch 61.

Each of the optical level sensors 45 produces a signal indicating the dc-level of the corresponding incoming STS-N frame as an instant alarm of a link failure if the detected dc-level falls below a predetermined value.

If a failure occurs in one of the incoming optical links, the output of the corresponding optical level sensor drops and the processor 43 knows that a link failure has occurred and produces an alarm message for the faulty link. This alarm message is converted to a 1.31-μm optical signal by optical transmitter 63 and multiplexed with an STS-N frame from switch 61 and transmitted on a link 62 to the upstream node.

After protection switching of the affected frame to a spare link, a troubleshooting procedure is provided for precisely determining the quality of the link under repair. This is achieved by sending an idle STS-N frame through the faulty link and a request message from the upstream node for monitoring the bit error rate of this idle frame at node 1. For this purpose, an STS-N path overhead extraction circuit 51 it connected to one of the output ports of the switch 46 via an optical receiver 50 to extract a path overhead from the idle STS-N frame.

Processor 43 receives the request message from the upstream node via optical demultiplexer 41 and optical receiver 42 and controls the switch 46 to establish a connection between one of the input ports specified by the request message and the path overhead extraction circuit 51. The extracted path overhead is fed to a BER monitor 52. BER monitor 52 uses parity in the B3-byte field of the extracted overhead to determine the bit error rate of overhead bytes located in a position specified by a path identifier contained in the path overhead. The idle frame is monitored in this way as an instantaneous recovering condition of an affected link.

A reply message will then be produced by processor 43 and transmitted to the upstream node via optical transmitter 63 and multiplexer 64, indicating the monitored result of the faulty link.

Figure 4:
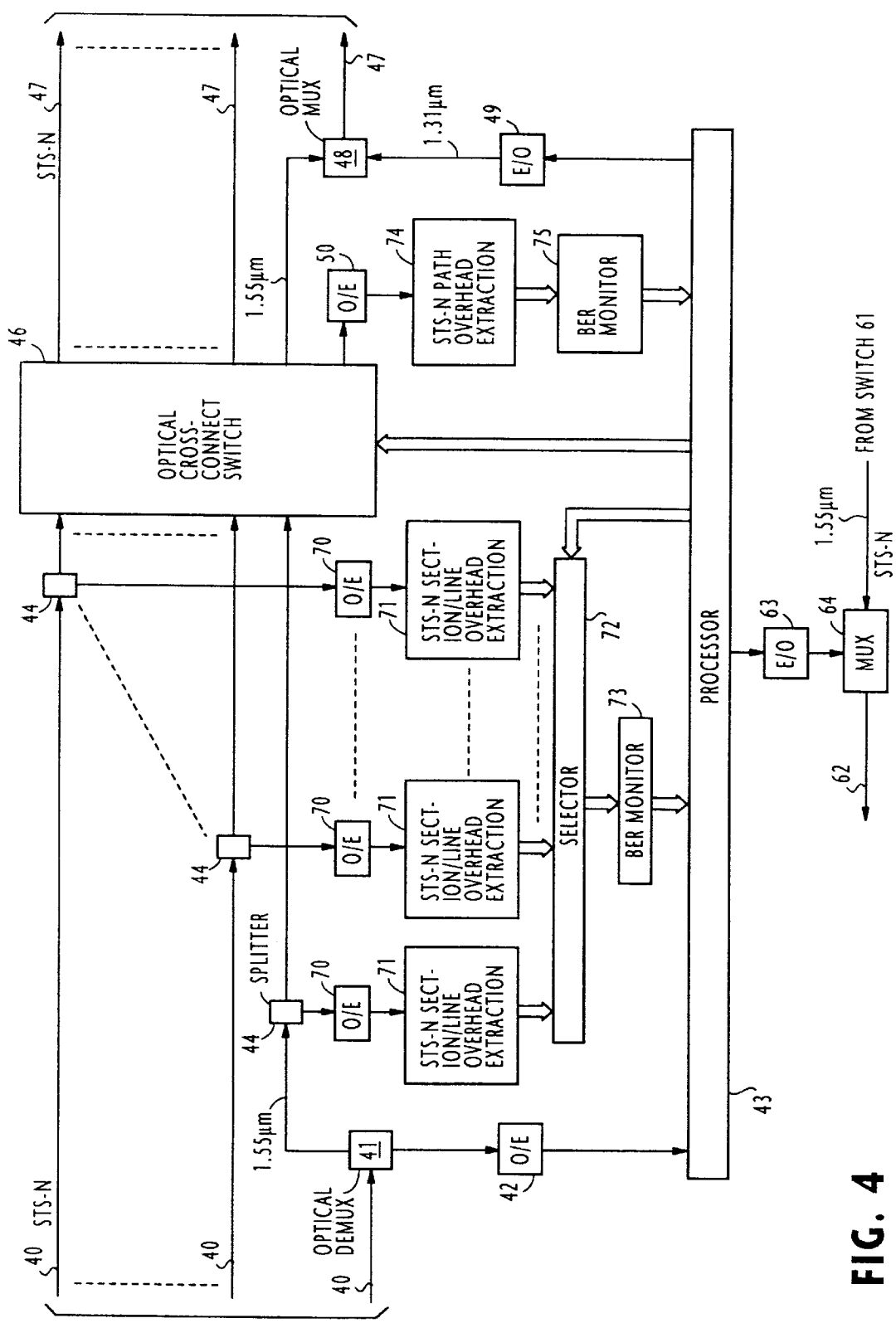
FIG. 4 is a block diagram of a modified form of the embodiment of FIG. 3.

The embodiment of FIG. 3 can be modified as shown in FIG. 4. In this modification, optical receivers 70 are connected to the splitters 44. A plurality of STS-N section or line overhead extraction circuits 71 are provided for an extracting STS-N section or line overhead from each incoming STS-N frame. The outputs of overhead extraction circuits 71 are sequentially scanned and selected by a selector 72 under control of processor 43 and supplied to a bit error rate monitor circuit 73. The BER monitor circuit 73 uses parity in B1-byte field of the extracted section overhead or parity in B2-byte field of the extracted line overhead to determine the bit error rate of overhead bytes specified by a section or line identifier. The output of BER monitor circuit 73 provides an instant indication of a failure on a section or line of a SONET system.

Processor 43 determines that one of the incoming optical links 40 has failed when the output of BER monitor circuit 73 has a predetermined value and transmits an alarm message to the upstream node. Upon receiving a request message from the upstream node, processor 43 controls the switch 46 to establish a connection between the input port specified by the request message and an STS-N path overhead extraction circuit 74 connected to the output of optical receiver 50. An idle STS-N frame is then transmitted over the faulty link from the upstream node, following protection switching of the affected frame to a spare link.

The STS-N path overhead extraction circuit 74 extracts an STS-N path overhead from the idle STS-N frame. The extracted path overhead is supplied to a BER monitor 75, which uses parity in B3-byte field of the extracted path overhead to determine the bit error rate of overhead bytes specified by a path identifier. The output of the BER monitor circuit 75 is representative of a quality level of an idle STS-N frame transmitted over a faulty path, and hence the recovering state of the faulty link. The output of the BER monitor 75 is contained in a reply message and transmitted to the upstream node. This embodiment is suitable for instant protection switching in the event of a faulty light modulator associated with in optical communication link.

What is claimed is:

1. A network node comprising:

a cross-connect switch having a plurality of input ports, which receive input signals, and a plurality of output ports;

a signal quality monitor connected to one of said output ports which determines a quality level of a select one of said input signals; and a processor coupled to said signal quality monitor and said switch, said processor being responsive to add/drop control information which controls said switch to selectively establish connections between said input ports and said output ports other than said one output port;

said processor further responsive to a request message received from another network node to control said switch to selectively establish a connection between a specified input port which is specified by said request message and said one output port so that said quality level of a specified input signal input to said specified input port is determined by said signal quality monitor, and said processor further transmits a reply message to said another network node, indicating said quality level of said specified input signal.

2. A network node as claimed in claim 1, wherein said processor is arranged to control said switch to sequentially establish connections between a plurality of said input ports specified by said request message and said signal quality monitor.

3. A network node as claimed in claim 1, wherein said processor is arranged to receive said request message via a switched telecommunications network and transmit said reply message via said switched telecommunications network.

4. A network node as claimed in claim 1, wherein said processor is arranged to receive said request message via a first multiplexed channel and to transmit said reply message via a second multiplexed channel.

5. A network node as claimed in claim 1, wherein said signal quality monitor comprises:

a path overhead extraction circuit which extracts a path overhead from said input signals received by said at least one input port; and a bit error rate monitor coupled to said path overhead extraction circuit, which determines a bit error rate of said specified input signal identified by a path identifier contained in said path overhead as an indication of said quality level.

6. A network node as claimed in claim 1, wherein said input signals received by said at least one input port form an STS-N frame, where N is equal to or greater than 1.

7. A network node as claimed in claim 1, further comprising:

a plurality of dc-level detectors which receive replica signals of said input signals applied to said input ports of said cross-connect switch and detect a dc-level of each of said replica signals to produce a plurality of detected dc-levels; and wherein said processor is responsive to a detected dc-level which has a predetermined value and transmits an alarm message in response thereto;

said processor further being responsive to a request message from said another node to control said cross-connect switch to establish a connection between one of said input ports specified by said request message and said signal quality monitor to allow said signal quality monitor to determine said quality level of an idle signal which is input to said one of said input ports.

8. A network node as claimed in claim 1, wherein said cross-connect switch is an optical cross-connect switch and said input signals are optical signals, said network node further comprising:

a plurality of optical splitters which produce a plurality of replica signals from a plurality of said optical signals input to said input ports;

a plurality of optical dc-level detectors which detect a dc-level of each of said replica signals to produce a plurality of detected dc-levels, and wherein said processor is responsive to a detected dc-level which has a predetermined value and transmits an alarm message in response thereto.

9. A network node as claimed in claim 5, further comprising:

a plurality of dc-level detectors which receive replica signals of said input signals applied to said input ports of said cross-connect switch and detect a dc-level of each of said replica signals to produce a plurality of detected dc-levels; and wherein said processor is responsive to a detected dc-level which has a predetermined value and transmits an alarm message in response thereto;

said processor further being responsive to a request message from said another node to control said cross-connect switch to establish a connection between one of said input ports specified by said request message and said path overhead extraction circuit to allow said bit error rate monitor to determine a bit error rate of an idle signal which is input to said specified input port.

10. A network node as claimed in claim 5, wherein said cross-connect switch is an optical cross-connect switch and said input signals are optical signals, said network node further comprising:

a plurality of optical splitters which produce a plurality of replica signals from a plurality of said optical signals input to said input ports, a plurality of optical dc-level detectors which detect a dc-level of each of said replica signals to produce a plurality of detected dc-levels; wherein said processor is responsive to a detected dc-level which has a predetermined value and transmits an alarm message in response thereto; and said processor further being responsive to a request message from said another node to control said optical cross-connect switch to establish a connection between said specified input port specified by said request message and said path overhead extraction circuit to allow said bit error rate monitor to determine a bit error rate of an optical idle signal input to said specified input port.

11. A network node as claimed in claim 5, further comprising:

a plurality of section/line overhead extraction circuits which receive replica signals of said input signals and extract section/line overheads from said replica signals, respectively; and at least one bit error rate monitor coupled to a said section/line overhead extraction circuits, which determines a bit error rate of a signal of said input signals, identified by a section/line identifier contained in each one of said overheads; wherein said processor is responsive to a bit error rate of a predetermined value and transmits an alarm message in response thereto; and said processor is further responsive to a request message from said another node to control said cross-connect switch to establish a connection between said specified input port specified by said request message and said path overhead extraction circuit to allow said bit error rate monitor to determine a bit error rate of an idle signal which is input to said specified input port.

12. A network node as claimed in claim 5, wherein said cross-connect switch is an optical cross-connect switch and said input signals are optical signals, said network node further comprising:

a plurality of optical splitters which produce a plurality of replica signals from a plurality of sad optical signals which are input to said input ports;

a plurality of section/line overhead extraction circuits which receive said replica signals and extract section/line overheads from said replicas, respectively; and at least one bit error rate monitor, coupled to said section/line overhead extraction circuit, which determines a bit error rate of a signal of said input signals identified by a section/line identifier contained in each one of said overheads wherein said processor is responsive to a bit error rate of a predetermined value and transmits an alarm message in response thereto; and said processor is further responsive to a request message from said other node to control said cross-connect switch to establish a connection between said specified input port specified by said request message and said path overhead extraction circuit to allow said bit error rate monitor to determine a bit error rate of an optical idle signal which is input to said specified input port.

13. A network node comprising:

a cross-connect switch having a plurality of input ports, which receive input signals, and a plurality of output ports;

a signal quality monitor connected to one of said output ports which determines a quality level of a select one of said input signals; and a control device, coupled to said signal quality monitor and said switch, said control device being responsive to add/drop control information which controls said switch to selectively establish connections between said input ports and said output ports other than said one output port;

said control device being further responsive to a request message received from another network node to control said switch to selectively establish a connection between a specified input port which is specified by said request message and said one output port so that said quality level of a specified input signal input to said specified input port is determined by said signal quality monitor, and said control device further transmits a reply message to said another network node, indicating said quality level of said specified signal.

* * * * *

UNITED STATES PATENT AND TRADEMARK OFFICE
CERTIFICATE OF CORRECTION

PATENT NO.   : 6,125,104
DATED        : September 26, 2000
INVENTOR(S)  : Tatsuya Shiragaki et al.

It is certified that error appears in the above-identified patent and that said Letters Patent is hereby corrected as shown below:

Item [56]

FOREIGN PATENT DOCUMENTS

| | | |
|---|---|---|
| 654674 | 05/24/95 | European |
| 721275 | 07/10/96 | European |

OTHER PUBLICATIONS

T. Uenoya, et al., "Operation Administration and Maintenance Systems of the Optical Fiber Loop", Communications: Connecting the Future, San Diego, December 2-5, 1990, pp. 1493-1497, Institute of Electrical and Electronics Engineers.

A. Fioretti, et al., "Application of Optical Transparency to the Telecommunications Core Network", ISS '95, World Telecommunications Congress (International Switching Symposium), Advanced Switching Technologies for Universal Telecommunications at the Beginning of the 21$^{st}$ Century Berlin, April 23-28, 1995, vol. 1, no. SYMP. 15, April 23, 1995, pp. 67-71.

M. Fujiwara. "Advanced Photonic Switching Technology for Communications", IEICE Transactions on Communications, vol. E78-B, no. 5, May 1, 1995, pp. 644-653.

Signed and Sealed this

Twenty-third Day of October, 2001

Attest:

NICHOLAS P. GODICI
*Acting Director of the United States Patent and Trademark Office*

*Attesting Officer*